United States Patent [19]
Kersting

[11] 3,781,065
[45] Dec. 25, 1973

[54] CONTROL VALVE
[75] Inventor: Raymond J. Kersting, Dellwood, Mo.
[73] Assignee: Wagner Electric Corporation, Newark, N.J.
[22] Filed: Feb. 11, 1972
[21] Appl. No.: 225,470

[52] U.S. Cl.................... 303/71, 137/624.27, 303/9
[51] Int. Cl.............................................. B60t 15/16
[58] Field of Search.................. 137/624.27; 303/9, 303/13, 36, 40, 50, 68, 71

[56] References Cited
UNITED STATES PATENTS
3,109,455  11/1963  Horowitz ......................... 303/50 X
3,314,438   4/1967  Ike ..................................... 303/9 X
3,511,276   5/1970  Jessen et al.................... 137/624.27

Primary Examiner—Duane A. Reger
Attorney—Joseph E. Papin et al.

[57] ABSTRACT

A control valve for use in a brake system having dual fluid pressure sources and a spring setting pressure released brake actuator is provided with selectively operable means for applying to said actuator fluid pressure supplied from one of said sources and for venting the applied fluid pressure to atmosphere to effect spring setting actuation of said actuator, and resiliently urged means is provided for also venting the applied fluid pressure to atmosphere independently of said selectively operable means when the fluid pressure of the other of said sources acting on said resiliently urged means is less than a predetermined value.

This invention relates generally to control valves and in particular to push-pull type control valves for use in a fluid pressure system to control a spring setting pressure released brake actuator thereof.

7 Claims, 2 Drawing Figures

PATENTED DEC 25 1973 3,781,065

3,781,065

CONTROL VALVE

BACKGROUND OF THE INVENTION

In the past, tripping or automatically actuated push-pull type control valves have been utilized in dual fluid pressure systems for controlling the application and exhaustion of emergency fluid pressure to and from a spring setting pressure released brake actuator to effect the desired de-energization and energization thereof, and such exhaustion of the applied fluid pressure was effected either manually, such as for vehicle parking purposes, or automatically by resiliently urged means in response to a predetermined low value of the service fluid pressure, such as encountered in vehicle emergency low pressure conditions; however, the main undesirable or disadvantageous feature of such past control valves and systems was that the exhaustion of the applied fluid pressure under such vehicle emergency low pressure conditions was rather limited or restricted effecting a sluggish or slow system response.

SUMMARY OF THE INVENTION

The principle object of the present invention is to provide a brake system and control valve therefor which overcome the aforementioned undesirable or disadvantageous features of such past brake systems and control valves, and this, as well as other objects and advantageous features of the present invention, will become apparent hereinafter.

Briefly, the invention includes a brake system having a brake adapted for spring set energization by a spring setting pressure released actuator in response to emergency fluid pressure applied thereto less than a predetermined value including means for manually venting the applied fluid pressure to atmosphere and other means automatically actuated in response to service fluid pressure subjected thereto less than a predetermined value for also venting the applied fluid pressure to atmosphere. The invention also comprises a control valve having selectively operable means for effecting the application through said control valve of fluid pressure supplied thereto and for venting the applied fluid pressure, and other means automatically responsive to another fluid pressure less than a predetermined value for actuating said selectively operable means to a position isolating the supplied and applied fluid pressures and thereafter venting the applied fluid pressure directly to atmosphere.

RELATED PATENTS

This patent application is related to U.S. Pat. application Ser. No. 137,798 filed Apr. 27, 1971 by George W. Stearns, U.S. Pat. application Ser. No. 174,340 filed Aug. 24, 1971 by Raymond J. Kersting, U.S. Pat. application Ser. No. 178,010 filed Sept. 7, 1971 by David R. Hardwick et al., and U.S. Pat. application Ser. No. 225,521 filed Feb. 11, 1972 by Raymond J. Kersting, said applications all being assigned to the common assignee of this patent application which is a patentably distinct improvement.

DESCRIPTION OF THE DRAWINGS

In the drawings which illustrate embodiments of the present invention and wherein like numerals refer to like parts wherever they occur.

DESCRIPTION OF THE PREFERRED EMBODIMENT

Figure 1:
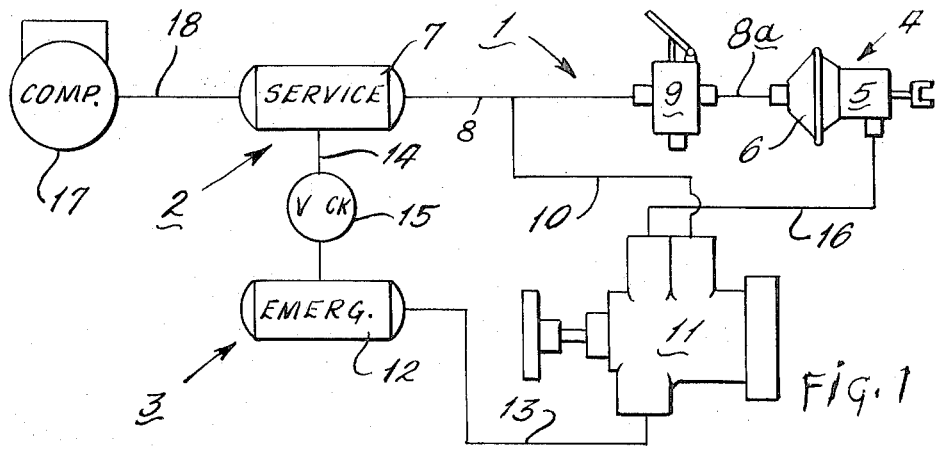
FIG. 1 is a schematic diagram of a fluid pressure system embodied in the present invention.

Referring now to the drawings in detail and in particular to FIG. 1, a dual fluid pressure or brake system 1 having service and emergency branches 2, 3 is shown for use on a vehicle having at least one spring setting fluid pressure released brake cylinder or actuator 4 of a type well known in the art and including a spring setting portion 5 and a fluid pressure responsive or motor portion 6 for energizing a vehicle brake (not shown). The service branch 2 is provided with a service reservoir 7 connected with the fluid pressure responsive motor 6 of the brake actuator 4 by conduits 8, 8a having the inlet and outlet sides of an operator actuated foot or application valve 9 of a type well known in the art serially interposed therebetween, and a conduit 10 is connected between the conduit 8 and a control port of a push-pull type control valve 11. The emergency branch 3 includes an emergency or protected reservoir 12 which is connected to the inlet port of the control 11 by a conduit 13, and another conduit 14 having a uni-directional or one-way check valve 15 interposed therein is connected between the service and emergency reservoirs 7, 12. To complete the description of the system 1, another conduit 16 is connected between the outlet port of the control valve 11 and the spring set portion 5 of the brake actuator 4, and fluid pressure generating means, such as a compressor 17, is connected to the service reservoir 7 by a conduit 18.

Figure 2:
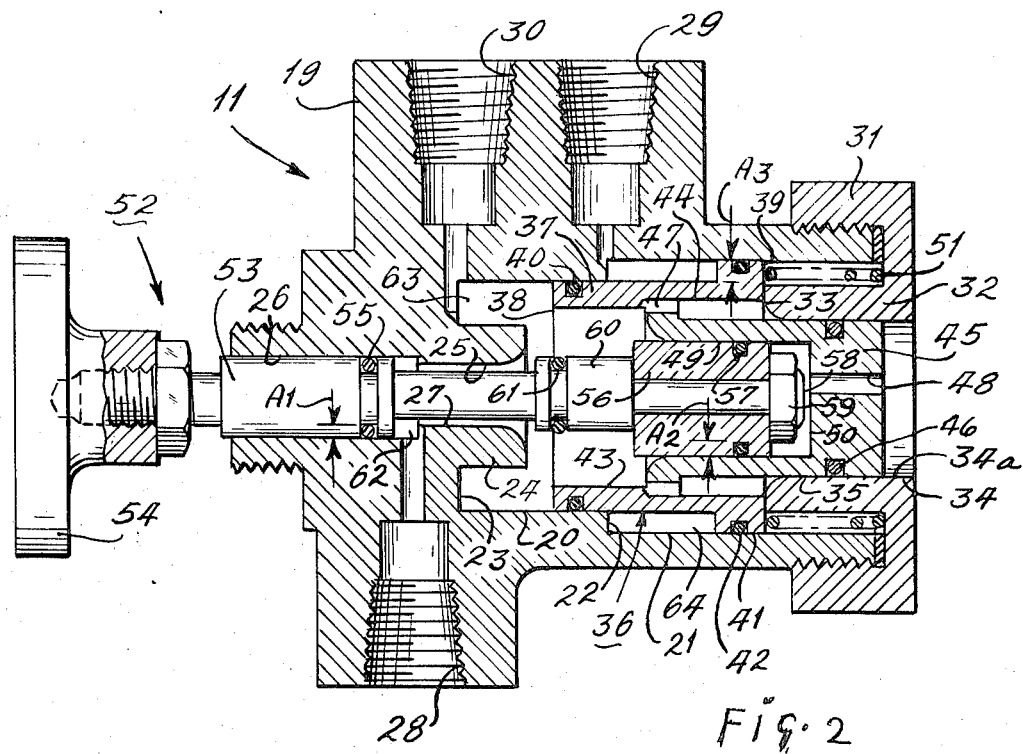
FIG. 2 is a sectional view illustrating the control valve of FIG. 1 also embodied in the present invention in cross-section.

Referring now to FIG. 2, the control valve 11 is provided with a housing 19 having a pair of stepped counterbores 20, 21 in the rightward end thereof, and an annular shoulder 22 is provided on said housing at the juncture of said stepped counterbores. An end wall 23 is provided on the housing 19 at the interior end of the smaller stepped counterbore 20, and an annular hub 24 is integrally formed on the housing 19 extending coaxially from said end wall into said smaller stepped counterbore. A bore 25 is axially provided in the hub 24 having one end connected in pressure fluid communication with the smaller stepped counterbore 20 and the other end thereof intersecting with another counterbore 26 axially provided in the housing 19, and the side wall of the hub bore 25 defines a valve seat 27. An inlet or emergency port 28 and a control or service port 29 which receives conduits 13, 10, as previously mentioned, are provided in the housing 19 intersecting with the counterbore 26 and the larger stepped counterbore 21, respectively, and an outlet or delivery port 30 which receives conduit 16, as previously mentioned, is also provided in said housing intersecting with the smaller stepped counterbore 20 adjacent to the end wall 23 thereof. A closure member 31 is threadedly received on the rightward end of the housing 19, and a hub portion 32 having a free end or abutment portion 33 thereon is integrally provided on said closure member extending coaxially into the larger stepped counterbore 21. A bore or exhaust passage 34 is axially provided through the closure member 31 and hub portion 32 thereof intersecting with the hub free end 33 thereof, and the exterior or rightward end portion of the hub bore 34 defines an exhaust port 34a while the side wall of said hub bore defines an exhaust valve seat 35.

An automatic actuating or resiliently urged means, such as the stepped control piston indicated generally at 36, is provided with a sleeve portion or member 37 having opposed ends 38, 39 thereon for abutting engagement with the housing end wall 23 and closure member free end 33 to define the inoperative and operative positions, respectively, of said control piston, as discussed hereinafter, and said sleeve member is slidably received in the smaller stepped counterbore 20 carrying a peripheral sealing member or O-ring 40 in sealing engagement therewith. A radially extending flange 41 is integrally provided on the sleeve member 37 adjacent to the rightward end portion 39 thereof, and said flange is slidably received in the larger stepped counterbore 21 carrying a peripheral sealing member or O-ring 42 in sealing engagement therewith. A pair of opposed stepped bores 43, 44 are provided in the control piston 36 respectively intersecting with the opposed ends 38, 39 thereof, and a coaxial extension or sleeve member, such as the piston means 45, has one end connected with the control piston 36 between the stepped bores 43, 44 thereof and the other end thereof slidable in the closure member bore 34 carrying a peripheral sealing member or O-ring 46 which defines a valve member for sealing engagement with the exhaust valve seat 35 of the closure member 31. A plurality of connecting passage means 47 are provided through the extension 45 adjacent to its leftward end interconnecting the control piston stepped bores 43, 44 in open pressure fluid communication, and a stepped exhaust passage or bore 48 is provided through the extension 45 connecting the control piston stepped bore 43 with the exhaust port 34a, said stepped exhaust bore having a sidewall portion defining an exhaust valve seat 49. An annular shoulder or abutment 50 is provided on the extension 45 between the stepped exhaust bores 48, and a spring 51 is biased between the closure member 31 and the rightward end 39 of the control piston 36. It should be noted that the control piston 36 is provided with an exhausting or venting flow passage B therethrough defined by the control piston bore 43 and stepped bores 48, and another exhausting or venting flow passage C is also provided in shunting or by-pass relation with the venting flow passage B, said by-passing flow passage C being defined by the control piston bore and passage means 44, 47, the housing larger stepped counterbore 21, and the closure member bore 34.

A selectively operable valve or application member, such as the push-pull or actuating rod indicated generally at 52, is provided with an exteriorly extending end or operator applied force receiving portion 53 to which is connected a knob 54, and said rod is slidably received in the housing counterbore 26 carrying a peripheral seal or O-ring 55 in sealing engagement therewith. A radially extending flange or exhaust valve member, such as the piston 56, is slidably received in the control piston exhaust passage 48 carrying a peripheral seal or exhaust valve member 57 for sealing engagement with the closure member exhaust valve seat 49 to interrupt pressure fluid communication between the exhaust port 34a and the outlet port 30, and said flange is retained on the interior abutment or free end portion 58 of the push rod 52 against displacement by a nut 59 threadedly received thereon, said push rod free end being engagable with the control piston shoulder 50 to define the "in" position of said push rod as shown. The push rod 52 is also provided with a reduced intermediate portion 60 integrally formed between the push rod exterior and interior ends 53, 58, and said intermediate portion extends coaxially through the housing hub bore 25 and the control piston bore 43 into the larger stepped bore 48. A sealing member or O-ring 61 is carried on the push rod intermediate portion 60 adjacent to the mid-portion thereof and defines a valve member for sealing engagement with the hub valve seat 27.

An expansible inlet chamber 62 is provided in the hub bore and counterbore 25, 26 between the sealing engagement of the push rod seal 55 with said counterbore and the sealing engagement of the push rod valve member 61 with the hub valve seat 27, and said inlet chamber is connected in pressure fluid communication with the inlet port 28 at all times. An outlet chamber 63 is defined in the housing smaller stepped counterbore 20 and the control piston bores 43, 44 between the housing end wall 23 and the closure member 31, said outlet chamber being in open pressure fluid communication with the outlet port 30 at all times. An expansible control chamber 64 is defined in the housing 19 between the housing larger stepped counterbore 21 and the control piston sleeve 37 and between the housing shoulder 22 and the control piston flange 41, said control chamber being in open pressure fluid communication with the control port 29 at all times.

The push rod 52 is provided with opposed annular, cross-sectional effective areas $A_1$, $A_2$ defined between the sealing engagements of the push rod seals 55, 61 with the housing counterbore 26 and hub bore valve seat 27 and between the sealing engagements of the push rod seals 55, 57 with the housing counterbore 26 and control piston exhaust valve seat 49, respectively, and the area $A_2$ which is subjected to the fluid pressure at the outlet port 30 is predeterminately greater than the area $A_1$ which is subjected to the fluid pressure at the inlet ports 28. The control piston 36 is provided with an annular, cross-sectional effective area $A_3$ defined between the sealing engagement of the control piston seals 40, 42 with the housing stepped counterbores 20, 21, respectively, and said area $A_3$ is subjected to the fluid pressure at the control port 29 opposing the force of the control piston spring 51.

OPERATION

With the control piston and push rod 36, 52 of the control valve 11 in their respective inoperative and "in" positions, as shown in FIG. 2, fluid pressure generated by the compressor 17 flows through the conduit 18 to the service reservoir 7 and therefrom through the conduit 14 and check valve 15 to the emergency reservoir 12. The service fluid pressure flows from the service reservoir 7 through the conduits 8, 10 to the control port 29 of the control valve 11 to establish a control fluid pressure in the control chamber 64 which acts on the effective area $A_3$ to establish a control force Fc, and when the magnitude of the control fluid pressure is in excess of a predetermined value, e.g., in the range of 20 to 45 psi, the control force Fc overcomes the opposing compressive force of the spring 51 to maintain the control piston 36 in its inoperative or "in" position engaging the rightward end 39 thereof with the closure member free end 33. The emergency or supplied fluid pressure flows from the emergency reservoir 12 through the conduit 13, the inlet port 28 of the control valve 11 and the inlet and outlet chambers 62, 63 to establish an output or applied fluid pressure at the outlet port 30, and the applied fluid pressure thereafter flows through the conduit 16 to the spring setting portion 5 of the brake actuator 4. When the magnitude of the applied fluid pressure is in excess of another predetermined value, e.g., in the range of 90 to 120 psi, said brake actuator is de-actuated and the brake (not shown) operatively connected therewith is deenergized. It should be noted that the applied fluid pressure at the outlet port 30 acts on the effective area $A_2-A_1$ of the push rod 52 to establish a holding force Fr urging said push rod rightwardly to maintain said push rod in its "in" position, as shown.

In the event of the failure of the service fluid pressure due to a compressor malfunction or a leak or the like in the system service branch 2 wherein the magnitude of the service or control fluid pressure in the control chamber 64 of the control valve 11 is reduced to the predetermined value, i.e., in the range of 20 to 45 psi, the control force Fc is correspondingly reduced in value, and the compressive force of the control piston spring 51 is effective to automatically move the control piston 36 leftwardly to drivingly engage the control piston shoulder 50 with the push rod free end 58. Upon the driving engagement of the control piston shoulder 50 and the push rod free end 58, the control piston and push rod 36, 52 are thereafter concertedly movable by the force of the control spring 51 to their respective operative and "out" or venting positions. During this initial concerted leftward movement, the rod valve member 61 is moved into sealing engagement with the hub bore valve seat 27 interrupting pressure fluid communication between the inlet and outlet chambers 62, 63 and isolating the supplied fluid pressure at the inlet port 28 from the applied fluid pressure at the outlet port 30, and further concerted leftward movement thereafter disengages the control piston exhaust valve member 46 from the closure member valve seat 35 to open the closure member exhaust passage 34 and thereby establish pressure fluid communication through the control piston venting passage C between the outlet and exhaust ports 30, 34a. In this manner, the applied fluid pressure is exhausted to atmosphere from the spring set portion 5 of the brake actuator 4 through the conduit 16, the outlet port 30, the outlet chamber 63, the control piston flow passage C, and the closure member exhaust bore and port 34, 34a. When the flow passage C is opened to vent the applied fluid pressure to atmosphere, as described above, it should be noted that such venting passage of the applied fluid pressure is in by-pass relation with the flow passage B which is closed by the sealing engagement of the push rod exhaust valve 57 with the control piston exhaust valve seat 49. After the disengagement of the control piston exhaust valve member 46 from the closure member exhaust valve seat 35, the leftward movement of the control piston 36 is arrested by the engagement of the leftward end 38 thereof with the housing end wall 23 which defines the operative or "out" position of said control piston. Upon such exhaustion of the applied fluid pressure, the spring setting portion 5 of the brake actuator 4 is actuated to effect a spring set energization of the brake connected therewith. With the push rod 52 now in its "out" position, the holding force Fr is, of course, eliminated due to the exhaustion of the applied fluid pressure to the atmosphere, and the supplied fluid pressure at the inlet port 28 now acts on the effective area $A_1$ to establish a leftwardly directed holding force F additive to the force of the control spring 51 to maintain said push rod in its "out" position.

When the control force Fc urges the control piston 36 toward its inoperative position, as previously discussed, it is readily apparent that the push rod 52 can be selectively and independently manually movable between its "in" and "out" positions relative to said control piston in response to an operator force selectively applied to the knob 54. As the push rod 52 is selectively moved leftwardly to its "out" position, the sealing engagement of the rod valve member 61 with the hub bore valve seat 27 is effective to close the hub bore 25 and isolate the supplied fluid pressure at the inlet port 28 from the applied fluid pressure at the outlet port 31, and thereafter further selective leftward movement of said push rod disengages the rod exhaust valve member 57 from the control piston exhaust valve seat 49 to open the control piston stepped bores 48 thereby establishing pressure fluid communication through the control piston flow passage B between the outlet port 30 and exhaust port 34a. In this manner, the applied fluid pressure is exhausted to atmosphere from the spring set portion 5 of the brake actuator 4 through the conduit 16, the outlet port 30, the outlet chamber 63 and the control piston flow passage B to the exhaust port 34a. When the flow passage B is opened to vent the applied fluid pressure to atmosphere, as described above, it should be noted that such venting passage of the applied fluid pressure is in by-pass relation with the flow passage C which is closed by the sealing engagement of the control piston exhaust valve 46 with the closure member exhaust valve seat 35. After the disengagement of the rod exhaust valve member 57 from the control piston exhaust valve seat 49, the manual leftward movement of the push rod 52 is arrested upon the engagement of the interior end of the push rod piston 56 with the interior free end of the hub 24 which defines the "out" position of said push rod. Upon such exhaustion of the applied fluid pressure, the spring setting portion 5 of the brake actuator 4 is again actuated to effect the spring setting energization of the brake connected therewith, and with the push rod 52 in its "out" position, the holding force Fr is eliminated and the holding force F is re-established, as previously described.

When the control piston and push rod 36, 52 are concertedly urged toward their respective operative and "out" positions by the compressive force of the control spring 51, as described hereinbefore, the operator can, if desired, override the automatic actuation of the control valve 11 by said control piston and spring. The overriding is accomplished by applying and maintaining a manual force on the knob 54 to drivingly engage the push rod free end 58 with the control piston shoulder 50 and concertedly move the push rod and control piston 52, 36 rightwardly toward their respective "in" and inoperative positions against the compressive force of the control spring 51. In this manner the control piston exhaust valve member 46 is re-engaged with the closure member exhaust valve seat 35 to close the flow passage B and isolate the outlet port 30 from the exhaust port 34a, and the rod valve member 61 is thereafter disengaged from the hub bore valve seat 27 to re-establish pressure fluid communication between the inlet and outlet ports 28, 30. With the push rod valve member 61 disengaged from the hub bore valve seat 27, the supplied or emergency fluid pressure again flows from the inlet port and chamber 28, 62 through the outlet chamber 63 to re-establish the applied fluid pressure at the outlet port 30, and the re-established applied fluid pressure flows from said outlet port through the conduit 16 to the spring set portion 5 of the brake actuator 4 to effect de-actuation thereof and the de-energization of the brake connected therewith.

It is, of course, desirable to override the automatic actuation of the control valve 11 and de-energize the brake to permit movement of the vehicle to a safe or off-the-road parking position until the service branch 2 can be repaired and the system 1 is again operable. When the vehicle has been moved to a desirable location for the repair of the system 1, the manually applied or override force is removed from the push rod 52 wherein the compressive force of the control spring 51 is again operable to effect the concerted movement of the control piston and push rod 36, 52 to their respective operative and "out" positions, as described hereinbefore.

From the foregoing, it is now apparent that a novel system 1 and control valve 11 meeting the objects and advantages set out hereinbefore, as well as others, are provided and changes in the precise configurations, shapes and details set forth in the disclosure by way of illustration may be made by those skilled in the art without departing from the spirit of the invention.

The embodiments of the invention in which an exclusive property or privilege is claimed are defined as follows:

1. A control valve comprising:
   a housing, said housing including an inlet port subjecting said housing to supplied fluid pressure, an outlet port subjecting said housing to applied fluid pressure, and an exhaust port for exhausting fluid pressure from said housing to atmosphere;
   a piston;
   a push rod, said piston and push rod relatively and concertedly movable in said housing between one position to effect the application through said housing of said applied fluid pressure supplied thereto and another position to isolate the supplied and applied fluid pressures and vent the applied fluid pressure through said exhaust port to atmosphere;
   a pair of venting passage means within said housing and defined therewith by said piston and said push rod, said venting passage means connected in bypass relation with each other for respectively venting the applied fluid pressure to atmosphere, one of said venting passage means being opened to vent the applied fluid pressure to atmosphere upon the movement of said push rod toward its other position relative to the piston and the other of said venting passage means being opened to vent the applied fluid pressure to atmosphere upon the concerted movement of said piston and push rod toward their other position;
   a control port subjecting said housing to control fluid pressure, said piston movable in said housing and defining therewith an expansible chamber subjected to control fluid pressure, said piston being urged against its own force toward its one position in response to said control fluid pressure in excess of a predetermined value acting thereon in said chamber and said piston being movable in response to its own force toward its other position when the control fluid pressure in said chamber acting on said piston is less than the predetermined value;
   a pair of opposed abutment means on said piston and said push rod for driving engagement, one of said abutment means being drivingly engaged with the other thereof to effect the concerted movement of said push rod with said piston toward their other position when the control fluid pressure in said chamber acting on said piston is less than the predetermined value;
   spring means engaged with said piston to urge it toward its other position;
   an effective area on said piston within said chamber and subjected to the control fluid pressure, said piston being movable toward its one position against said spring means in response to the control fluid pressure in excess of the predetermined value acting on said area and said spring means urging said piston toward its other position to drivingly engage said one abutment means with said other abutment means and effect the concerted movement of said push rod with said piston toward their respective one positions when the control fluid pressure acting on said area is less than the predetermined value;
   opposed end portions on said piston;
   a passage in said piston intersecting with said opposed end portions and defining at least a portion of said one venting passage means; and
   another passage in said piston having one end intersecting with said first named passage and the other end thereof intersecting with one of said opposed end portions, said other passage defining at least a portion of said other venting passage means.

2. A control valve according to claim 1, comprising:
   a pair of valve means on said piston and said push rod for controlling said first named and other passages, respectively, one of said valve means being movable toward an open position in said first named passage to establish the venting flow therethrough of the applied fluid pressure upon the relative movement of said push rod toward its other position and the other of said valve means being movable toward an open position in said other passage to establish the venting flow therethrough of the applied fluid pressure upon the concerted movement of said piston and push rod toward their other positions.

3. A control valve according to claim 2, comprising a pair of valve seats on said piston means and housing about said first named passage and said other venting passage means for engagement with said one and other valve means, respectively, said one valve means being disengaged from one of said valve seats to open said first named passage upon the relative movement of said push rod means toward its other position and said other valve means being disengaged from the other of said valve seats to open said other venting passage means upon the concerted movement of said piston and push rod toward their other positions.

4. A control valve comprising a housing having inlet, outlet, exhaust and control ports therein, selectively operable means movable in said housing including valve means for controlling pressure fluid communication between said inlet and outlet ports, said valve means being movable with said selectively operable means in response to an applied force thereon toward a position in said housing interrupting pressure fluid communication between said inlet and outlet ports, resiliently urged means movable in said housing for driving engagement with said selectively operable means and subjected to fluid pressure at said control port, said resiliently urged means being movable in response to fluid pressure less than a predetermined value acting thereon at said control port to drivingly engage and concertedly move said selectively operable means to actuate said valve means to its pressure fluid communication interrupting position, and a pair of exhaust valve means on said selectively operable means and resiliently urged means for controlling pressure fluid communication between said outlet and exhaust ports, respectively, said exhaust valve means being movable toward positions in said housing establishing pressure fluid communication between said outlet and exhaust ports upon the selective applied force movement of said selectively operable means and the concerted movement of said selectively operable means and resiliently urged means to actuate said first named valve means to its pressure fluid communication interrupting position, respectively, a pair of exhaust valve seats on said housing and said resiliently urged means between said outlet and exhaust ports for engagement with said exhaust valve means, respectively, said exhaust valve means being movable toward positions disengaged from said exhaust valve seats to establish the pressure fluid communication between said outlet and exhaust ports upon the selective applied force movement of said selectively operable means and the concerted movement of said selectively operable means and resiliently urged means to actuate said first named valve means toward its pressure fluid communication interrupting position, respectively, said resiliently urged means includes piston means movable in said housing between said outlet and exhaust ports, one of said exhaust valve means being on said piston means, an effective area on said piston means subjected to the fluid pressure at said control port, spring means biased between said piston means and housing, said piston means being movable against said spring means toward a position engaging said one exhaust valve means with one of said exhaust valve seats in response to fluid pressure in excess of the predetermined value at said control port acting on said area, the other of said exhaust valve seats being on said piston means.

5. A control valve according to claim 4, comprising first passage means in said piston means connected with said outlet and exhaust ports and extending through said other exhaust valve seat, and a second passage means in said piston means connected with said outlet and exhaust port and in by-pass relation with said other exhaust valve seat, said second passage means being closed when said one exhaust valve means is engaged with said one exhaust valve seat.

6. A control valve according to claim 5, comprising a pair of opposed abutment means on said housing for engagement with said piston means, said piston means being urged into engagement with one of said abutment means when the fluid pressure at said control port acting on said area is in excess of the predetermined value and said spring means being effective to concertedly move said piston means and selectively operable means to actuate said first named valve means toward its pressure fluid communication interrupting position and to engage said piston means with the other of said abutment means when the fluid pressure at said control port acting on said area is less than the predetermined value, and said one exhaust valve means being disengaged from said one exhaust valve seat to open said second passage means when said piston means is engaged with said other abutment means.

7. A control valve comprising a housing having a bore therein axially interposed between a pair of stepped counterbores and a third counterbore, a pair of shoulders on said housing between said stepped counterbores and between said bore and the smaller of said stepped counterbores, an inlet port in said housing intersecting with said third counterbore, an outlet port in said housing intersecting with said smaller stepped counterbore adjacent to one of said shoulders, a control port in said housing intersecting with the larger of said stepped counterbores adjacent to the other of said shoulders, a closure member connected with said housing including a hub portion extending into said larger stepped counterbore and having a free end thereon, and a bore extending through said closure member and hub portion connecting with said larger stepped counterbore, said bore defining an exhaust port and having a sidewall portion defining a first valve seat between said larger stepped counterbore and said exhaust port, a stepped piston movable in said housing between said outlet and exhaust ports including a sleeve member having first and second opposed end portions for respective engagement with said free end portion and said one shoulder, said sleeve member being slidable in said smaller stepped counterbore and extending coaxially into said larger stepped counterbore, flange means on said sleeve member and slidable in said larger stepped counterbore, said sleeve member and flange means defining with said housing an expansible chamber in said larger stepped counterbore and connected in pressure fluid communication with said control port, an effective area on said flange means within said chamber and subjected to the fluid pressure at said control port, said stepped piston being urged toward an inoperative position in said housing engaging said first opposed end portion with said hub free end when the fluid pressure at said control port acting on said area exceeds a predetermined value, spring means engaged with said stepped portion and opposing expansion of said chamber, extension means on said stepped piston having opposed ends, one of said extension means opposed ends being connected with said sleeve member and the other opposed end thereof being slidable in said hub bore, a first valve member on said extension means other opposed end for engagement with said first valve seat, first passage means extending through said sleeve member and extension means between said outlet and exhaust ports, said first passage means including a sidewall portion in said extension means defining a second valve seat, second passage means in said stepped piston connected in by-pass relation with said second valve seat between said first passage means and said exhaust port, said first valve member being engaged with said first valve seat to close said second passage means interrupting pressure fluid communication therethrough between said outlet and exhaust ports when said stepped piston is in its inoperative position, said housing bore having a sidewall portion defining a third valve seat between said inlet and outlet ports, a selectively operable valve member movable in said housing between one and other positions including opposed third and fourth end portions respectively slidable in said third counterbore and said first passage means, said third end portion extending exteriorly of said housing for receiving an operating applied force thereon, a reduced intermediate portion connected between said third and fourth end portions, a second valve member on said fourth portion for engagement with said second valve seat, said second valve member being engaged with said second valve seat to close said first passage means interrupting pressure fluid communication therethrough when said rod member and stepped pistons are in their respective in and inoperative positions and said rod member being movable in response to an applied force thereon toward its out position to disengage said second valve member from said second valve seating opening said first passage means and establishing pressure fluid communication therethrough between said outlet and exhaust ports when said stepped piston is in its inoperative position, a third valve member on said intermediate portion for engagement with said third valve seat, said third valve member being movable with said rod member between its in and out positions toward positions disengaged from and engaged with said third valve seat to establish and interrupt pressure fluid communication between said inlet and outlet ports, respectively, and a pair of opposed abutment means on said stepped piston and rod member for respective driving engagement, said stepped piston being movable in response to the force of said spring means toward an operative position in said housing engaging said second opposed end portion with said one shoulder and to drivingly engage one of said abutment means with the other thereof to effect concerted movement therewith of said rod member toward its out position when the fluid pressure at said control port acting on said area is less than the predetermined value, said first valve member being movable toward a position disengaged from said first valve seat to open said second passage means and establish pressure fluid communication therethrough between said outlet and exhaust ports upon the movement of said stepped piston toward its operative position.

* * * * *